(12) United States Patent
Mott et al.

(10) Patent No.: US 9,352,708 B2
(45) Date of Patent: May 31, 2016

(54) CONNECTOR ASSEMBLY AND TERMINAL RETAINER

(71) Applicant: Lear Corporation, Southfield, MI (US)

(72) Inventors: Allen Leo Mott, Livonia, MI (US); Michael Glick, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/329,411

(22) Filed: Jul. 11, 2014

(65) Prior Publication Data

US 2014/0320082 A1    Oct. 30, 2014

Related U.S. Application Data

(62) Division of application No. 13/588,542, filed on Aug. 17, 2012, now Pat. No. 8,808,039.

(60) Provisional application No. 61/525,881, filed on Aug. 22, 2011.

(51) Int. Cl.
*B60R 16/03* (2006.01)
*H01R 13/629* (2006.01)
(Continued)

(52) U.S. Cl.
CPC ............. *B60R 16/03* (2013.01); *B60L 11/1809* (2013.01); *B60L 11/1818* (2013.01); *B60L 11/1825* (2013.01); *H01R 13/502* (2013.01);
(Continued)

(58) Field of Classification Search
CPC ..................................................... H01R 13/187
USPC ................................... 439/844–847, 851, 852
See application file for complete search history.

(56) References Cited

U.S. PATENT DOCUMENTS 2,912,668 A    11/1959    Eddy
3,059,208 A    10/1962    Concelman
(Continued)

FOREIGN PATENT DOCUMENTS

CH             151479        3/1932
CN             102005679 A   4/2011
(Continued)

OTHER PUBLICATIONS

Chinese Office Action for corresponding Application No. 201210307017.2, mailed Jul. 2, 2014, 8 pages.
(Continued)

*Primary Examiner* — Ross Gushi
(74) *Attorney, Agent, or Firm* — Brooks Kushman P.C.

(57) ABSTRACT

A receptacle assembly is provided with an electrically conductive terminal received within a receptacle. A longitudinal guide body is received within the receptacle in engagement with the terminal. The guide body has an aperture formed therethrough, which is sized to receive a pin through the aperture. At least one fastener extends from the guide body to provide an interference fit with a housing of the receptacle. A retainer is also provided with at least one fastener extending from a guide body to fasten the retainer to the receptacle. A charge assembly is also provided with a handle housing. A shoulder extends transversely from the guide body to engage a distal end of the receptacle and to position the guide body relative to the receptacle. A sleeve extends from the shoulder at least partially over the receptacle housing. The sleeve is formed integrally with the handle housing.

16 Claims, 16 Drawing Sheets

(51) Int. Cl.
  *B60L 11/18*    (2006.01)
  *H01R 13/502*   (2006.01)
  *H01R 13/187*   (2006.01)

(52) U.S. Cl.
  CPC ........... *H01R13/629* (2013.01); *B60L 2270/32* (2013.01); *B60L 2270/34* (2013.01); *H01R 13/187* (2013.01); *Y02T 10/7005* (2013.01); *Y02T 90/121* (2013.01); *Y02T 90/128* (2013.01); *Y02T 90/14* (2013.01)

(56) References Cited

U.S. PATENT DOCUMENTS

| | | | | |
|---|---|---|---|---|
| 3,161,451 | A * | 12/1964 | Neidecker | H01R 13/20 439/268 |
| 3,161,541 | A | 12/1964 | Holub | |
| 3,784,965 | A * | 1/1974 | Murphy | H01R 12/718 439/844 |
| 4,002,400 | A | 1/1977 | Evans | |
| 4,258,970 | A | 3/1981 | Bourdon et al. | |
| 4,401,359 | A * | 8/1983 | Frelk | H01R 13/20 439/846 |
| 4,508,413 | A | 4/1985 | Bailey | |
| 4,572,606 | A * | 2/1986 | Neumann | H01R 13/187 29/882 |
| 4,679,875 | A | 7/1987 | Ramsey | |
| 4,714,441 | A | 12/1987 | Corman | |
| 4,734,063 | A * | 3/1988 | Koch | H01R 13/187 439/844 |
| 4,734,064 | A | 3/1988 | Knapp et al. | |
| 4,826,144 | A | 5/1989 | Balsells | |
| 4,934,967 | A | 6/1990 | Marks et al. | |
| 5,106,328 | A * | 4/1992 | Prochaska | H01R 13/187 439/751 |
| 5,139,276 | A | 8/1992 | Balsells | |
| 5,151,040 | A | 9/1992 | Tanaka | |
| 5,203,813 | A * | 4/1993 | Fitzsimmons | H01R 43/16 29/876 |
| 5,358,224 | A | 10/1994 | Balsells | |
| 5,376,012 | A | 12/1994 | Clark | |
| 5,449,304 | A * | 9/1995 | Huss, Jr. | H01R 13/18 439/825 |
| 5,474,309 | A | 12/1995 | Balsells | |
| 5,474,479 | A * | 12/1995 | Bennett | H01R 13/187 439/843 |
| 5,482,476 | A | 1/1996 | Watanabe et al. | |
| 5,588,852 | A * | 12/1996 | Puerner | H01R 13/44 439/135 |
| 5,591,039 | A * | 1/1997 | Matthews | H01R 13/53 439/181 |
| 5,599,027 | A | 2/1997 | Balsells | |
| 5,658,175 | A | 8/1997 | Muzslay | |
| 5,667,413 | A * | 9/1997 | Trafton | H01R 13/5219 439/271 |
| 5,676,571 | A * | 10/1997 | Matthews | H01R 13/187 439/839 |
| 5,730,628 | A * | 3/1998 | Hawkins | A61N 1/3752 439/843 |
| 5,735,716 | A * | 4/1998 | Bilezikjian | H01R 13/187 439/843 |
| 5,816,643 | A | 10/1998 | Itou et al. | |
| 5,921,803 | A * | 7/1999 | Mori | B60L 11/1818 439/387 |
| 5,938,487 | A | 8/1999 | Henry et al. | |
| 6,039,614 | A * | 3/2000 | Ramari | H01R 13/20 439/843 |
| 6,042,432 | A * | 3/2000 | Hashizawa | H01R 13/187 439/843 |
| 6,062,919 | A * | 5/2000 | Trafton | H01R 13/187 439/843 |
| 6,102,746 | A * | 8/2000 | Nania | H01R 13/11 439/675 |
| 6,102,751 | A | 8/2000 | Becker | |
| 6,186,841 | B1 | 2/2001 | Jacobsson | |
| 6,190,215 | B1 | 2/2001 | Pendleton et al. | |
| 6,250,974 | B1 * | 6/2001 | Kerek | H01R 13/187 439/843 |
| 6,254,439 | B1 * | 7/2001 | Endo | H01R 13/187 439/843 |
| 6,264,508 | B1 * | 7/2001 | Lehmann | H01R 13/187 439/843 |
| 6,273,766 | B1 * | 8/2001 | Zennamo, Jr. | H01R 13/187 439/843 |
| 6,296,970 | B1 | 10/2001 | Killebrew et al. | |
| 6,464,546 | B2 * | 10/2002 | LaCoy | H01R 13/187 439/847 |
| 6,475,039 | B1 | 11/2002 | Despouys | |
| 6,482,049 | B1 * | 11/2002 | Swearingen | H01R 4/4881 439/843 |
| 6,602,090 | B2 | 8/2003 | Kato | |
| 6,752,668 | B2 * | 6/2004 | Koch, Jr. | H01R 13/187 439/387 |
| 6,811,453 | B2 * | 11/2004 | Williams | H01R 13/18 439/843 |
| 6,835,084 | B2 | 12/2004 | Poon et al. | |
| 6,837,756 | B2 * | 1/2005 | Swearingen | H01R 4/4881 439/843 |
| 6,848,922 | B2 * | 2/2005 | Coughlan | H01R 13/53 439/181 |
| 6,899,571 | B1 | 5/2005 | Koch et al. | |
| 6,966,802 | B2 * | 11/2005 | Hielscher | H01R 13/187 439/840 |
| 7,048,596 | B2 * | 5/2006 | Swearingen | H01R 4/4881 439/843 |
| 7,074,096 | B2 | 7/2006 | Copper et al. | |
| 7,191,518 | B2 * | 3/2007 | Beloritsky | H01R 13/187 29/747 |
| 7,393,252 | B2 | 7/2008 | Ribeau et al. | |
| 7,828,609 | B2 * | 11/2010 | Li | H01R 13/187 29/862 |
| 7,845,992 | B2 * | 12/2010 | Glick | H01R 4/185 439/843 |
| 7,892,050 | B2 | 2/2011 | Pavlovic et al. | |
| 7,909,236 | B2 | 3/2011 | Erdie | |
| 8,282,429 | B2 * | 10/2012 | Glick | H01R 13/111 439/843 |
| 8,414,339 | B1 * | 4/2013 | Glick | H01R 13/187 439/357 |
| 8,425,253 | B2 * | 4/2013 | Malloy | H01R 9/05 439/575 |
| 8,430,698 | B2 * | 4/2013 | Stewart | H01R 13/111 439/843 |
| 8,840,436 | B2 | 9/2014 | Mott et al. | |
| 2002/0055305 | A1 | 5/2002 | Williams | |
| 2002/0122690 | A1 | 9/2002 | Poon et al. | |
| 2003/0040228 | A1 | 2/2003 | Finzer et al. | |
| 2003/0077950 | A1 * | 4/2003 | Swearingen | H01R 4/4881 439/843 |
| 2004/0245686 | A1 | 12/2004 | Balsells | |
| 2005/0242910 | A1 | 11/2005 | Balsells | |
| 2007/0190868 | A1 | 8/2007 | De Cloet et al. | |
| 2008/0246231 | A1 | 10/2008 | Sjostedt et al. | |
| 2008/0254670 | A1 | 10/2008 | Balsells et al. | |
| 2008/0255631 | A1 | 10/2008 | Sjostedt et al. | |
| 2009/0048638 | A1 | 2/2009 | Rey et al. | |
| 2009/0258519 | A1 | 10/2009 | Dilmaghanian et al. | |
| 2009/0298356 | A1 * | 12/2009 | Li | H01R 13/187 439/843 |
| 2010/0029127 | A1 | 2/2010 | Sjostedt | |
| 2010/0029145 | A1 | 2/2010 | Balsells et al. | |
| 2010/0191299 | A1 * | 7/2010 | Ayzenberg | 607/2 |
| 2010/0279558 | A1 | 11/2010 | Leon et al. | |
| 2010/0311266 | A1 | 12/2010 | Dilmaghanian et al. | |
| 2011/0034053 | A1 * | 2/2011 | Matsumoto | B60L 3/0069 439/304 |
| 2011/0171850 | A1 * | 7/2011 | Brown, II | B60L 11/1818 439/372 |
| 2012/0000329 | A1 | 1/2012 | Glick et al. | |
| 2012/0003880 | A1 | 1/2012 | Glick et al. | |
| 2012/0003882 | A1 * | 1/2012 | Stewart | H01R 13/111 439/840 |
| 2012/0003883 | A1 | 1/2012 | Pavlovic et al. | |
| 2012/0282797 | A1 * | 11/2012 | Mott | H01R 13/111 439/357 |

(56) References Cited

U.S. PATENT DOCUMENTS

| | | | | |
|---|---|---|---|---|
| 2012/0282823 A1* | 11/2012 | Glick | .................. | H01R 13/187<br>439/877 |
| 2012/0322322 A1* | 12/2012 | Stewart | ................ | H01R 13/187<br>439/843 |
| 2013/0017739 A1* | 1/2013 | Glick | .................. | H01R 13/187<br>439/842 |
| 2013/0052854 A1* | 2/2013 | Mott | .................... | H01R 13/629<br>439/345 |
| 2013/0109221 A1* | 5/2013 | Glick | .................. | H01R 13/187<br>439/357 |
| 2013/0109237 A1* | 5/2013 | Glick | .................. | H01R 13/187<br>439/625 |
| 2013/0337702 A1* | 12/2013 | Pavlovic | .............. | H01R 13/635<br>439/700 |

FOREIGN PATENT DOCUMENTS

| | | |
|---|---|---|
| DE | 19836196 A1 | 2/1999 |
| DE | 19943373 A1 | 3/2000 |
| DE | 102004002403 B3 | 7/2005 |
| FR | 997233 | 3/1952 |
| JP | 2007317403 A | 12/2007 |
| WO | 2010060370 A1 | 6/2010 |

OTHER PUBLICATIONS

"SAE Electric Vehicle and Plug in Hybrid Vehicle Conductive Charge Coupler", Surface Vehicle Recommended Practice, J1772 Jan. 2010, SAE International, Issued Oct. 1996, Revised Jan. 2010, 51 pages.

* cited by examiner

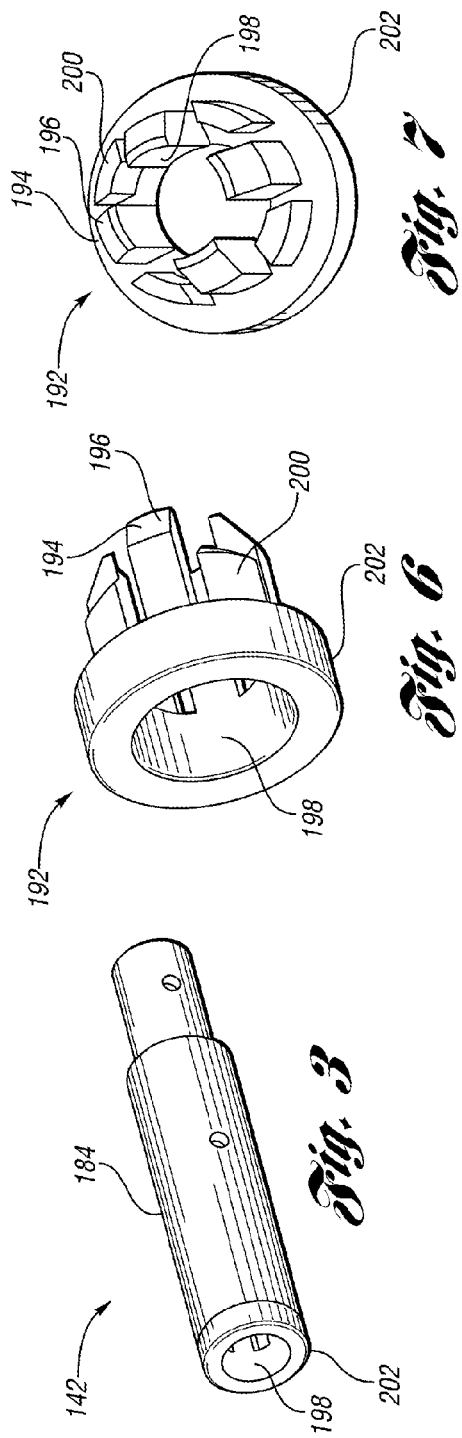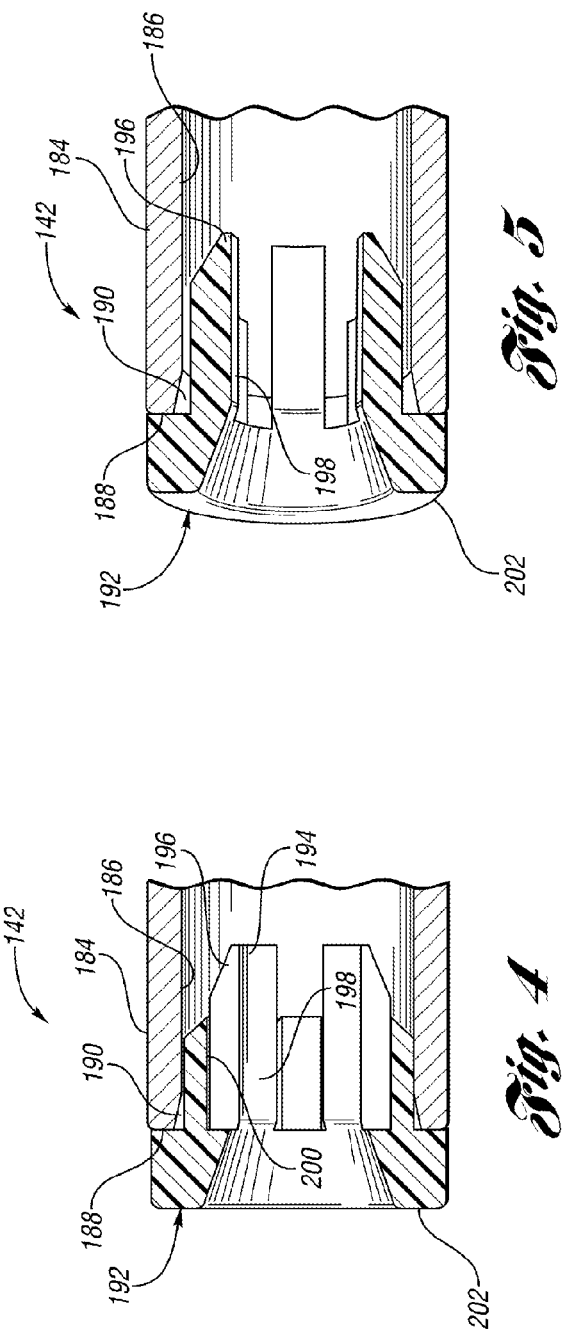

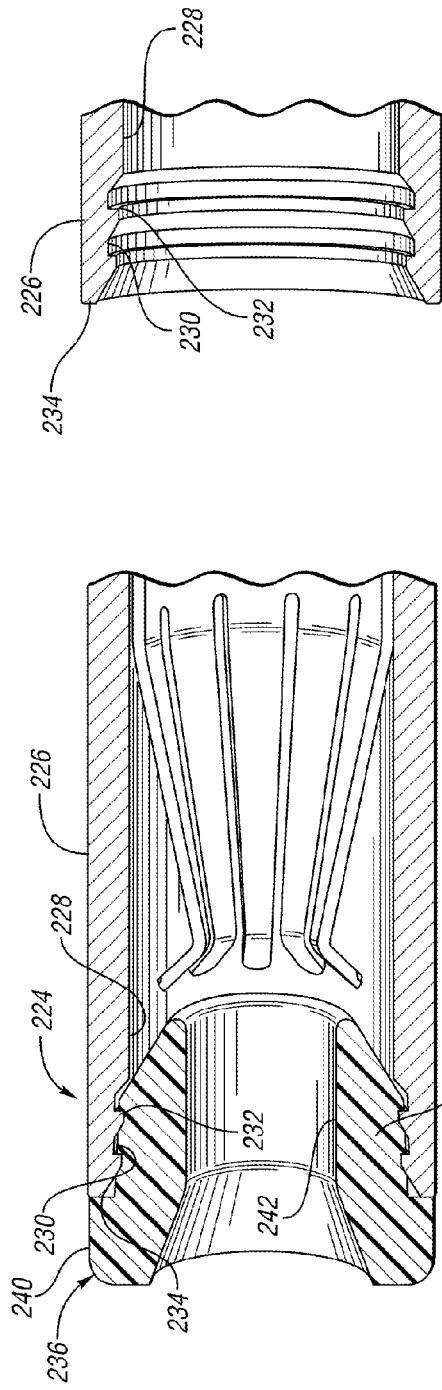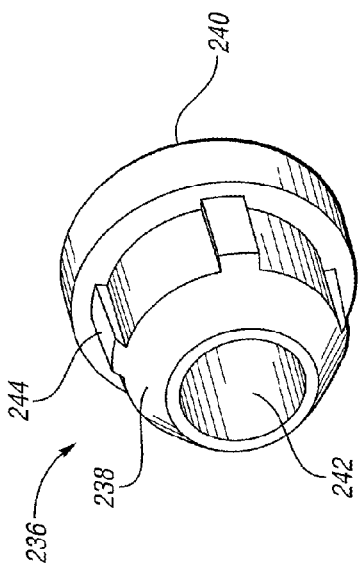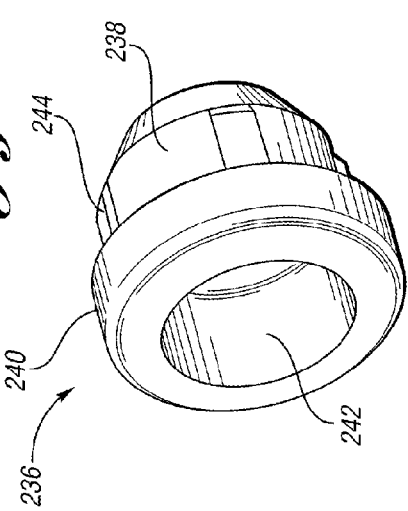

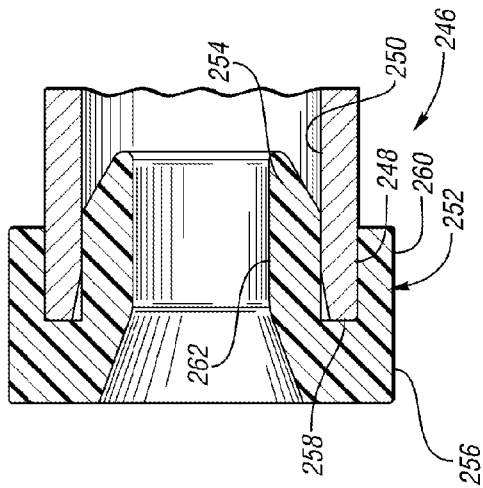
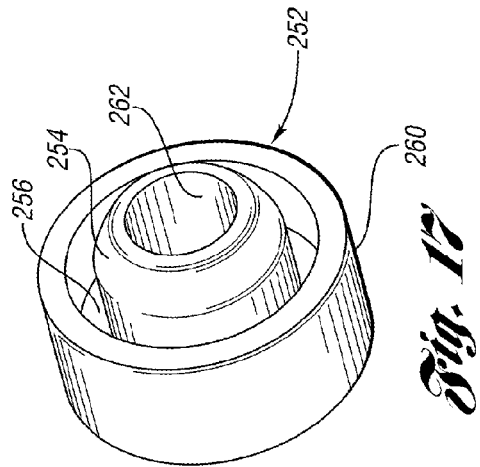
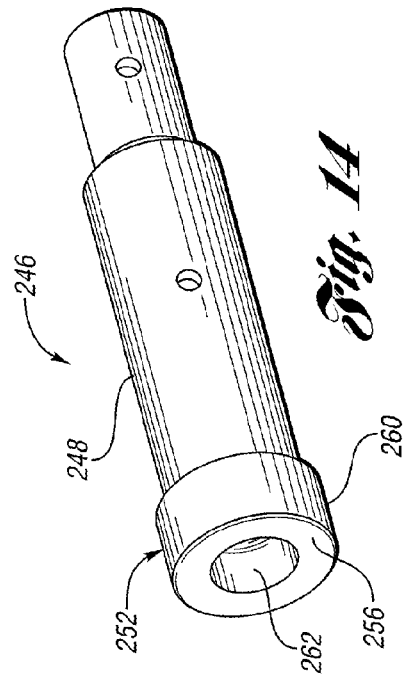
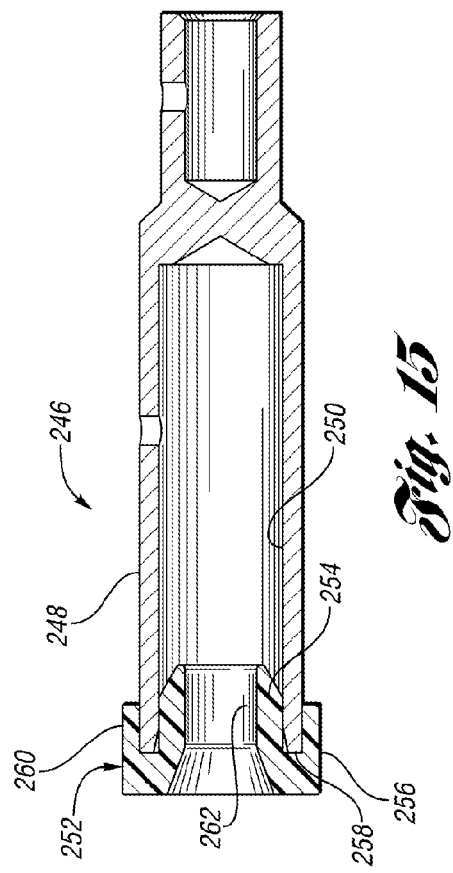

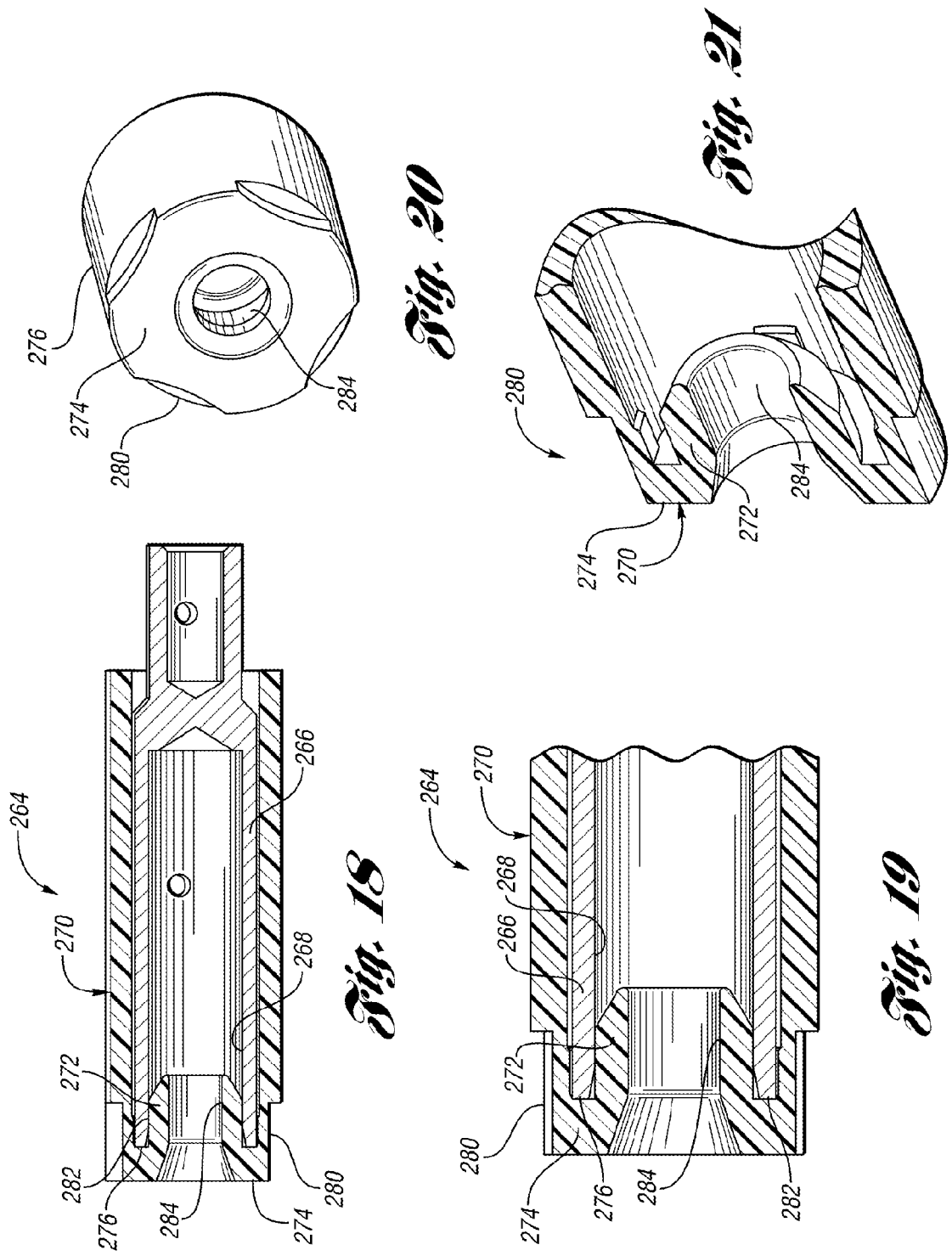

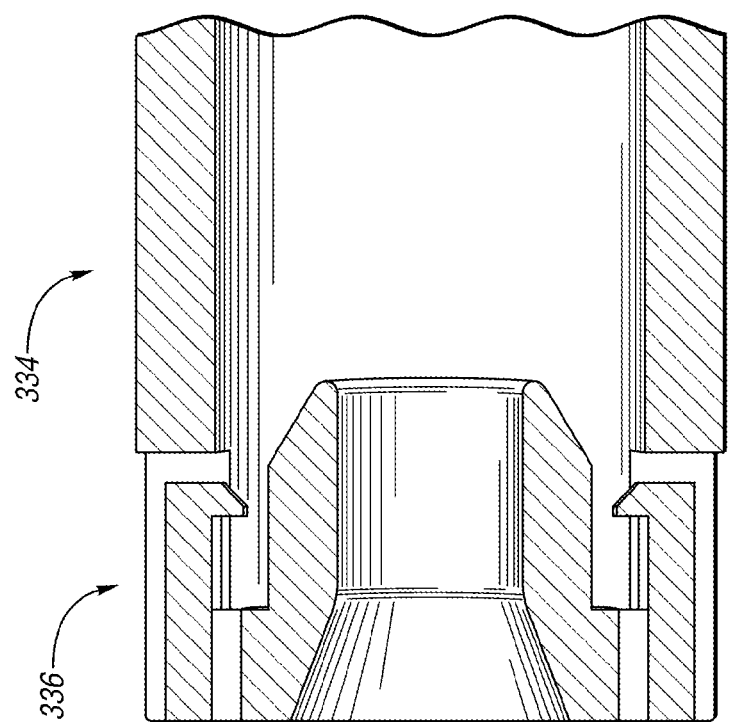

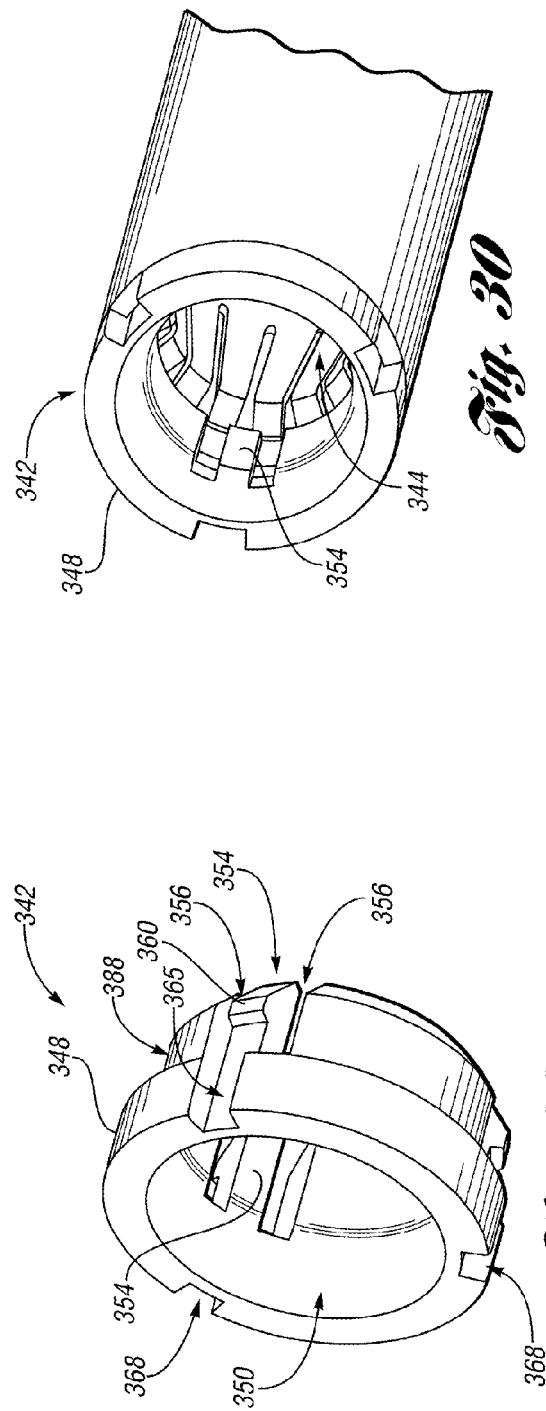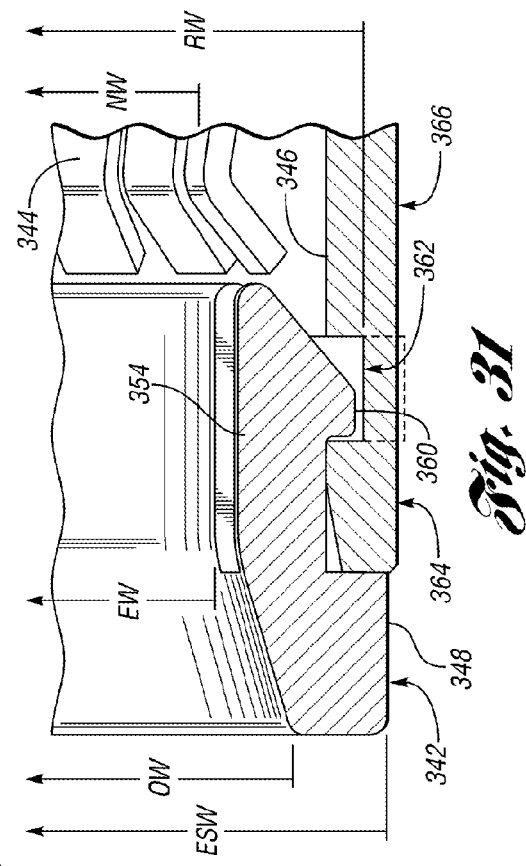

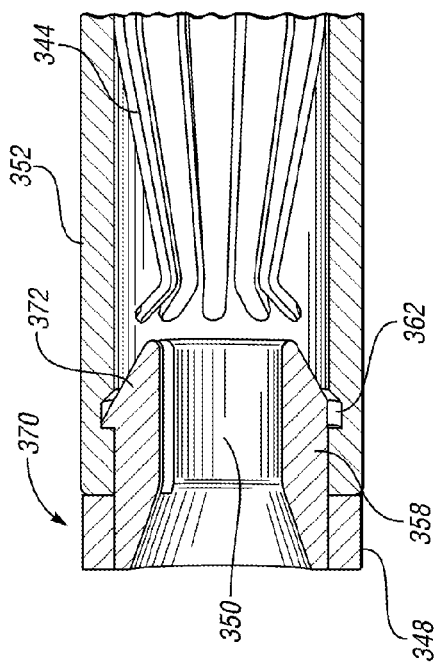
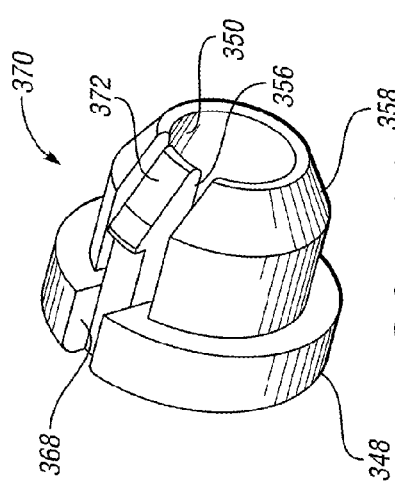
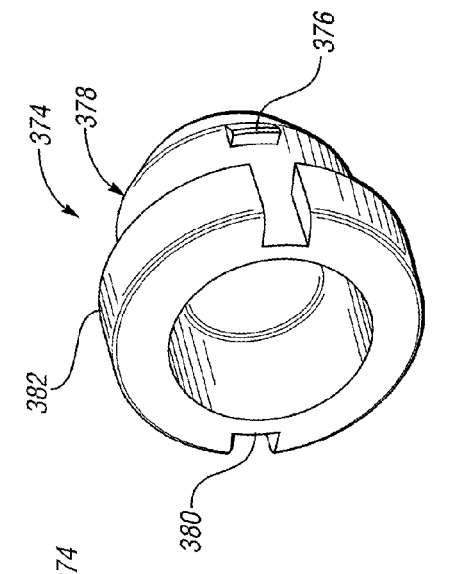
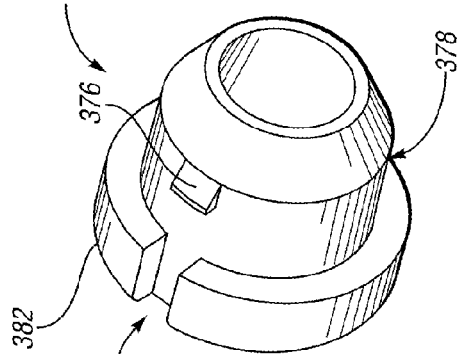
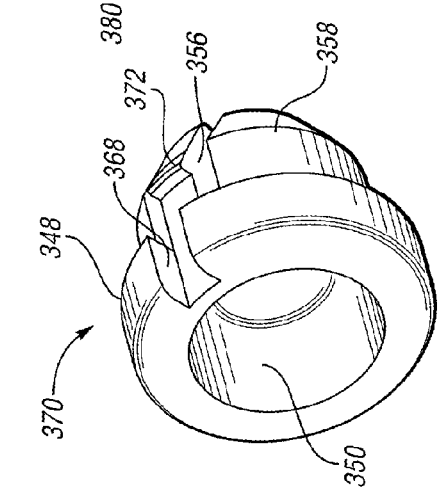

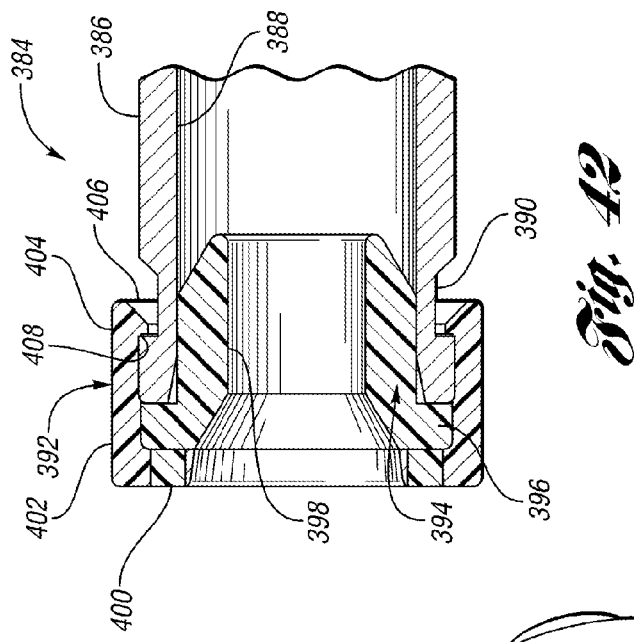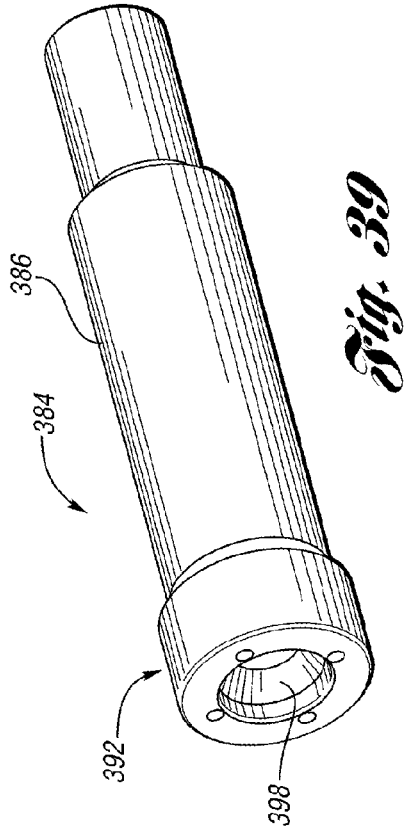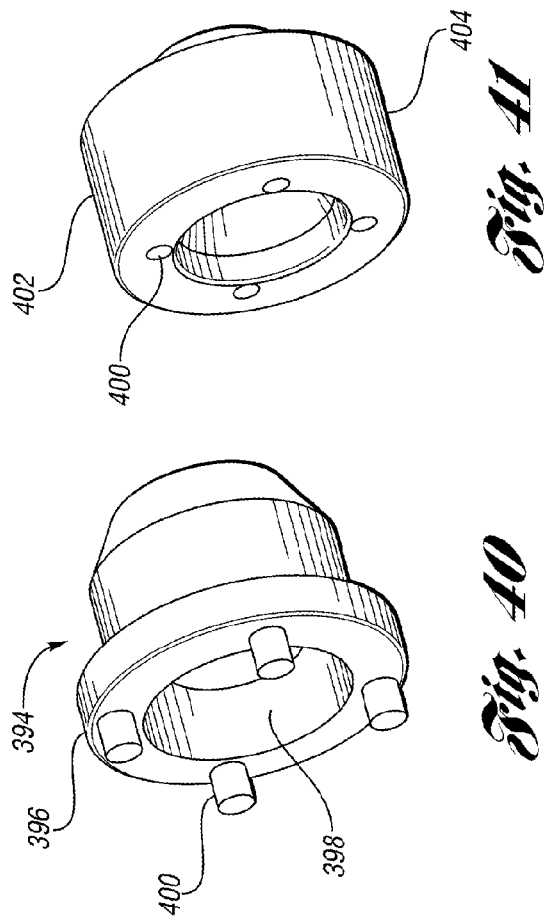

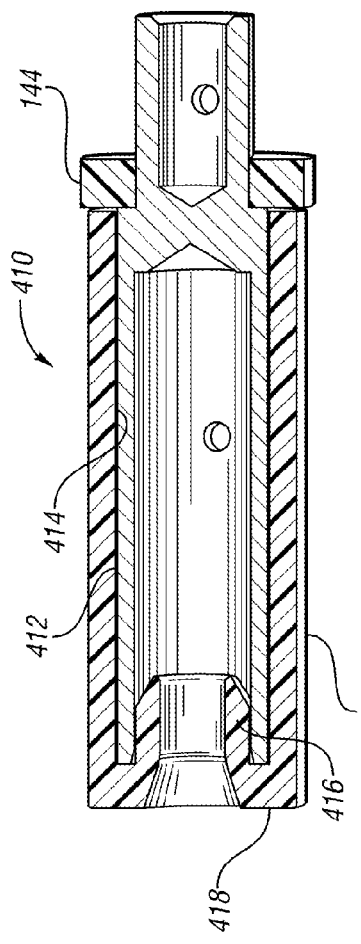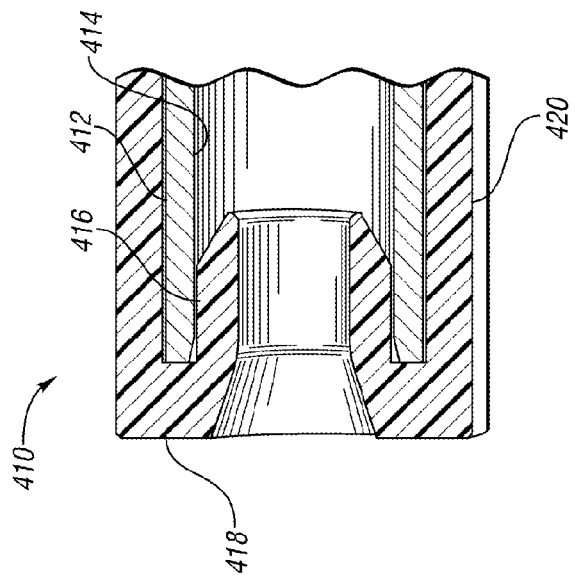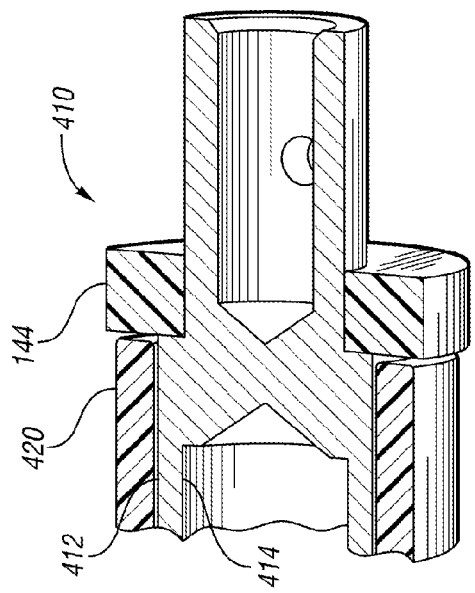

CONNECTOR ASSEMBLY AND TERMINAL RETAINER

CROSS-REFERENCE TO RELATED APPLICATIONS

This application is a division of U.S. application Ser. No. 13/588,542 filed Aug. 17, 2012, now U.S. Pat. No. 8,808,039 B2, which, in turn, claims the benefit of U.S. provisional application Ser. No. 61/525,881 filed Aug. 22, 2011, the disclosures of which are hereby incorporated in their entirety by reference herein.

TECHNICAL FIELD

Various embodiments relate to electrical receptacle assemblies and retainers for receptacle assemblies.

BACKGROUND

One example of an electrical connector for vehicle charging is disclosed in U.S. Pat. No. 7,878,866 B1 to Kwasny et al.

SUMMARY

According to at least one embodiment, a receptacle assembly is provided with a longitudinal housing with at least one receptacle formed therein with an opening at a distal end of the housing. An electrically conductive terminal is received within the receptacle. A longitudinal guide body is received within the receptacle in engagement with the terminal. The guide body has an aperture formed therethrough, which is sized to receive a pin through the aperture. At least one fastener extends from the guide body to provide an interference fit with the housing.

According to at least another embodiment, a retainer is provided to retain an electrically conductive terminal within a receptacle. The retainer has a longitudinal guide body sized to be received within the receptacle and engage the terminal to retain the terminal within the receptacle. The guide body has an aperture formed therethrough, which is sized to receive a pin through the aperture to contact the terminal. At least one fastener extends from the guide body to fasten the retainer to the receptacle.

According to at least another embodiment, a receptacle assembly is provided with a longitudinal housing with at least one receptacle formed therein with an opening at a distal end of the housing and a groove formed in the housing. An electrically conductive terminal is received within the receptacle. A retainer is provided to retain the terminal within the receptacle. The retainer has a longitudinal guide body sized to be received within the receptacle and engage the terminal to retain the terminal within the receptacle. The guide body has an aperture formed therethrough, which is sized to receive a pin through the aperture to contact the terminal. At least one fastener extends from the guide body to fasten the retainer to the receptacle. The guide body is received within the receptacle. The at least one fastener is received within the groove.

According to at least another embodiment, a charge assembly is provided with a handle housing. A plurality of receptacle assemblies are provided, each with a longitudinal housing with at least one receptacle formed therein with an opening at a distal end of the housing. An electrically conductive terminal is received within the receptacle. A longitudinal guide body is received within the receptacle in engagement with the terminal. The guide body has an aperture formed therethrough, which is sized to receive a pin through the aperture. A shoulder extends transversely from the guide body to engage a distal end of the receptacle and to position the guide body relative to the receptacle. A sleeve extends from the shoulder at least partially over the receptacle housing. Each sleeve is formed integrally with the handle housing.

BRIEF DESCRIPTION OF THE DRAWINGS

FIG. 3 is a perspective of a receptacle assembly of the connector assembly of FIG. 1;

FIG. 4 is an enlarged partial section view of a distal end of the receptacle assembly of FIG. 3;

FIG. 5 is another enlarged partial section view of the distal end of the receptacle assembly of FIG. 3;

FIG. 6 is an enlarged front perspective view of a retainer of the receptacle assembly of FIG. 3;

FIG. 7 is another enlarged rear perspective view of the retainer of FIG. 6;

FIG. 10 is a partial section view of a receptacle assembly according to another embodiment;

FIG. 11 is an enlarged partial section view of a distal end of a receptacle of the receptacle assembly of FIG. 10;

FIG. 12 is a front perspective view of a retainer of the receptacle assembly of FIG. 10;

FIG. 13 is a rear perspective view of the retainer of FIG. 12;

FIG. 14 is a perspective view of a receptacle assembly according to another embodiment;

FIG. 15 is a section view of the receptacle assembly of FIG. 14;

FIG. 16 is an enlarged section view of a distal end of the receptacle assembly of FIG. 14;

FIG. 17 is an enlarged rear perspective view of a retainer of the receptacle assembly of FIG. 14;

FIG. 18 is a section view of a receptacle assembly according to at least one embodiment;

FIG. 19 is an enlarged section view of a distal end of the receptacle assembly of FIG. 18;

FIG. 20 is a enlarged perspective view of a distal end of a retainer of the receptacle assembly of FIG. 18;

FIG. 21 is an enlarged partial section perspective view of the retainer of FIG. 20;

FIG. 28 is an enlarged section view of a retainer of the receptacle assembly of FIG. 26;

FIG. 29 is a perspective view of a retainer according to an embodiment;

FIG. 30 is a perspective view of a distal end of a receptacle assembly according to another embodiment, illustrated with the retainer of FIG. 29;

FIG. 31 is an enlarged partial section view of the distal end of the receptacle assembly of FIG. 30;

FIG. 33 is a rear perspective view of a retainer according to an embodiment;

FIG. 34 is a front perspective view of the retainer of FIG. 33;

FIG. 35 is a partial section view of a receptacle assembly according to an embodiment, illustrated with the retainer of FIG. 33;

FIG. 36 is a rear perspective view of a retainer according to an embodiment;

FIG. 37 is a front perspective view of the retainer of FIG. 36;

FIG. 39 is a perspective view of a receptacle assembly according to another embodiment;

FIG. 40 is an enlarged perspective view of a guide of the receptacle assembly of FIG. 39;

FIG. 41 is an enlarged perspective view of a retainer of the receptacle assembly of FIG. 39;

FIG. 42 is an enlarged section view of a distal end of the receptacle assembly of FIG. 39;

FIG. 43 is a section view of a receptacle assembly according to another embodiment;

FIG. 44 is an enlarged partial section perspective view of a proximal end of the receptacle assembly of FIG. 43; and FIG. 45 is an enlarged partial section view of a distal end of the receptacle assembly of FIG. 43.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
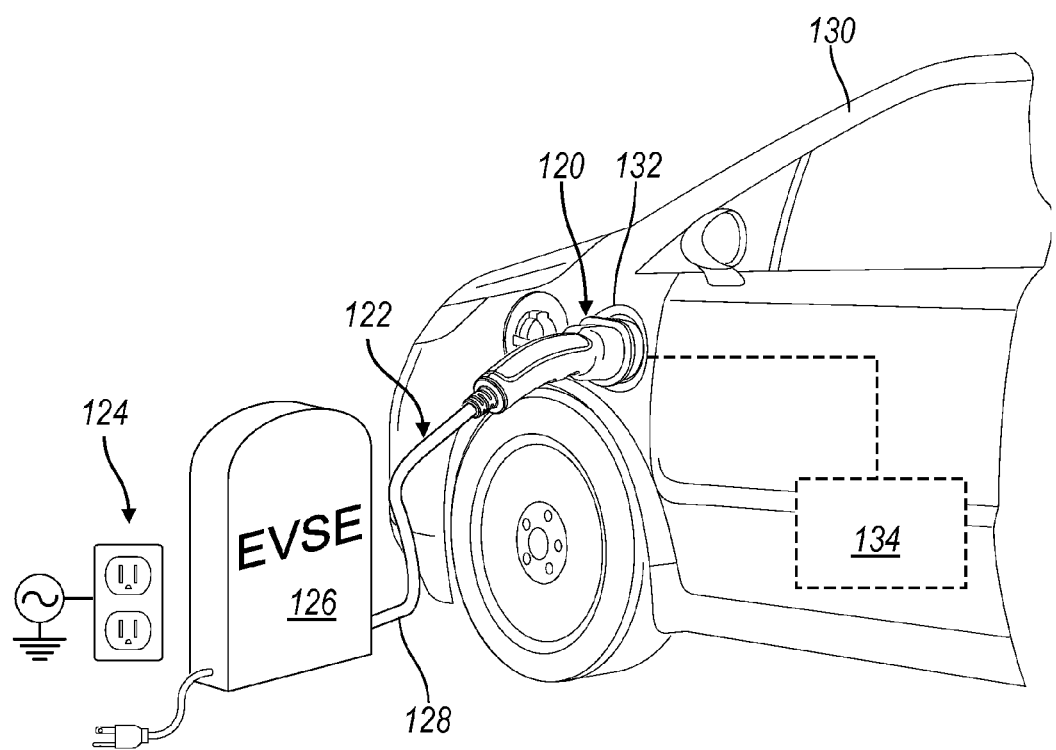
FIG. 1 is a perspective view of a connector assembly according to an embodiment illustrated in cooperation with a vehicle and a power supply.

With reference to FIG. 1, a connector assembly for facilitating electric charging of a vehicle is illustrated in accordance with an embodiment and is referenced generally by numeral 120. In general, the connector assembly 120 may be configured to accommodate a number of different electrical harness configurations by interchanging a couple components.

The connector assembly 120 is included in a cordset assembly 122, according to one or more embodiments. The cordset assembly 122 includes a connector for connecting to an external power supply 124 for receiving electrical energy. The external power supply 124 represents an alternating current (AC) electrical power supply, such as a standard residential power circuit. The cord set assembly 122 includes electric vehicle supply equipment (EVSE) 126 and a charging cable 128. The charging cable 128 extends between the EVSE 126 and the connector assembly 120. The EVSE 126 is configured to monitor electrical energy passing through the cable 128 during charging. The cordset assembly 122 may be configured to be portable (as shown in FIG. 1) or fixed to a charging station (not shown).

The connector assembly 120 attaches to a "plug-in" vehicle 130, such as a hybrid electric vehicle, for supplying electrical energy to the vehicle 130. The vehicle 130 includes a vehicle charging receptacle 132 that is connected to a battery 134 for receiving and storing electrical energy. The vehicle charging receptacle 132 is mounted to be externally accessible from the vehicle 130. The vehicle receptacle 132 receives the connector assembly 120. The battery 134 is electrically connected to the charging receptacle 132 for storing electrical power. The vehicle 130 may also include a converter (not shown) for converting AC to DC electrical power for storage in the battery 134. The vehicle 130 may be an electric vehicle, or any suitable vehicle that receives external electric power.

Figure 2:
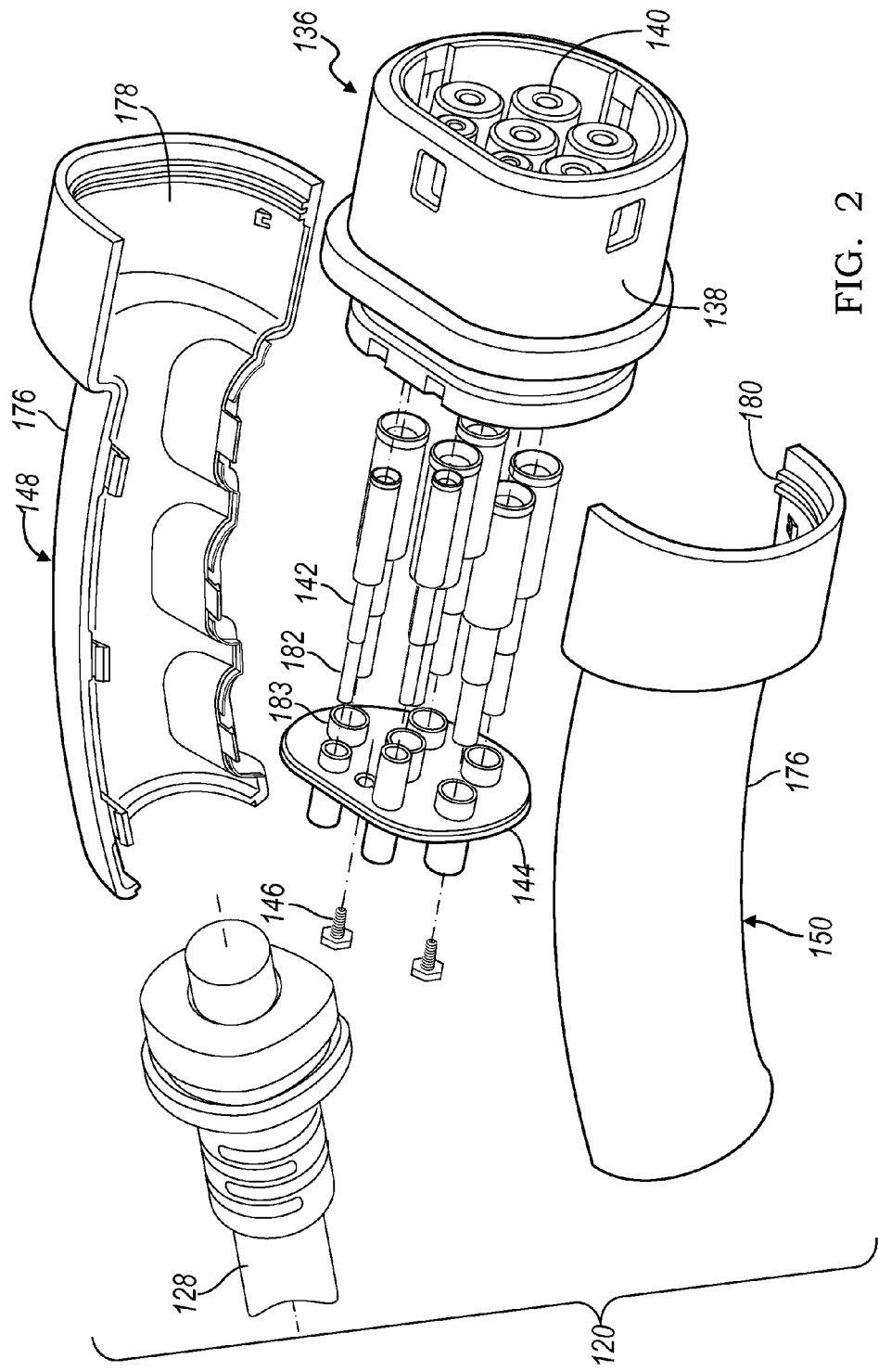
FIG. 2 is an exploded perspective view of the connector assembly of FIG. 1.

Referring now to FIG. 2, the connector assembly 120 is illustrated exploded for revealing the various components. The connector assembly 120 includes a first housing portion 136 that has an external plug 138 that is sized to be received within the vehicle charging receptacle 132. The receptacle housing portion 136 includes a plurality of recessed sockets 140 that are each sized to receive an electrical connector, such as a receptacle assembly 142. The receptacle assemblies 142 are female electrical connectors that are inserted into the sockets 140 and retained into the sockets 140 by a backing plate 144 that is fastened to the receptacle housing portion 136 by fasteners 146.

The receptacles 142 receive a plurality of pins (not shown) that are recessed within the vehicle charging receptacle 132 as is known in the art. By inserting the plug 138 into the vehicle charging receptacle 132, the receptacle assemblies 142 are aligned with the pins and the pins are received within the sockets 140 and consequently the receptacle assemblies 142 making electrical connection between the cordset assembly 122 and the vehicle 130. Although female receptacle assemblies 142 are illustrated and described, the invention contemplates any conductive connectors for the connector assembly 120. Alternatively, the sockets 140 may retain male pin connectors.

The connector assembly 120 includes a second housing portion 148 and a third housing portion 150. The second housing portion 148 and the third housing portion 150 are similar, yet mirror images of each other, for assembly in a clamshell configuration for retaining the cable 128 and the first housing portion 136. Once assembled, the housing portions 136, 148, 150 collectively provide a handle for manual manipulation of the connector assembly 120. The second and third housing portions 148, 150 collectively provide an exterior 176 for the connector assembly 120, and each include a cavity 178, 180. Wires 182 extend from the cable 128 within the cavity 178, 180, through apertures 183; and are connected to the receptacle assemblies 142.

With reference now to FIG. 3, one of the receptacle assemblies 142 is illustrated according to at least one embodiment. The receptacle assembly 142 includes a longitudinal housing 184 with a receptacle 186 formed therein. The receptacle 186 is illustrated in FIGS. 4 and 5. The receptacle 186 includes an opening 190 at a distal end 188 of the housing 184. An electrically conductive terminal (not shown) is received within the receptacle 186. A retainer 192 is illustrated in FIGS. 3-7, which acts a partial cap for retaining the terminal within the receptacle 186. The retainer 192 includes a longitudinal body 194 with an array of extensions or bosses 196 received within the receptacle for engagement with, and retention of, the terminal.

The guide body 194 has an aperture 198 formed through the body 194 and through the array of bosses 196. The aperture 198 is sized to receive a pin through the aperture 198 for electrical contact with the terminal. The body 194 and the bosses 196 collectively provide a guide for guiding the pin into alignment and contact with the terminal. An array of fasteners 200 extends from the guide body 194 into the receptacle 186. The fasteners 200 are also bosses that have an overall outer diameter that is greater than an inner diameter of the receptacle 186 to provide an interference fit or press fit within the receptacle 186 thereby retaining the retainer 192 to the receptacle housing 184, and consequently retaining the terminal in the receptacle 186.

The fasteners 200 are spaced apart from the aperture 198 so that deformation of the fasteners 200 after installation does not affect the guide provided by the guide bosses 196 and the aperture 198. Further, the guide bosses 196 are not in direct contact with the fasteners 200, and are not in direct contact with the receptacle housing 184 for providing a guide for the male pin without being affected by the installation of the retainer 192 to the receptacle 186.

The retainer 192 includes a shoulder 202 that extends transversely and engages the distal end 188 of the receptacle housing 184 to position the guide body 194 relative to the receptacle 186. The aperture 198 is formed through the shoulder 202 whereby the shoulder 202 contributes to the guide body 194. The arrays of the bosses 196 and fasteners 200 extend form the shoulder 202.

The terminal provides contact with the male pin that is sufficient to maintain electrical contact, without causing undue wear to the terminal or pin. Isolating the fastening feature from the guiding feature ensures adequate retention without disrupting the guidance and alignment of the pin. The retainer may be formed from any suitable material, conductive or insulated depending on the application requirements. The terminal provides electrical contact between the pin and the housing 184.

Figure 9:
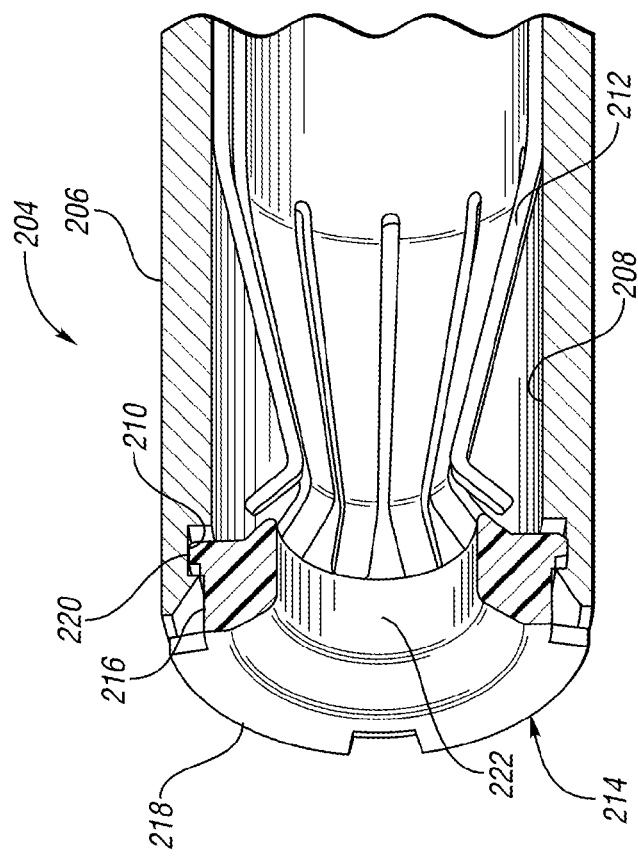
FIG. 9 is a perspective view of a retainer of the receptacle assembly of FIG. 8.
Figure 8:
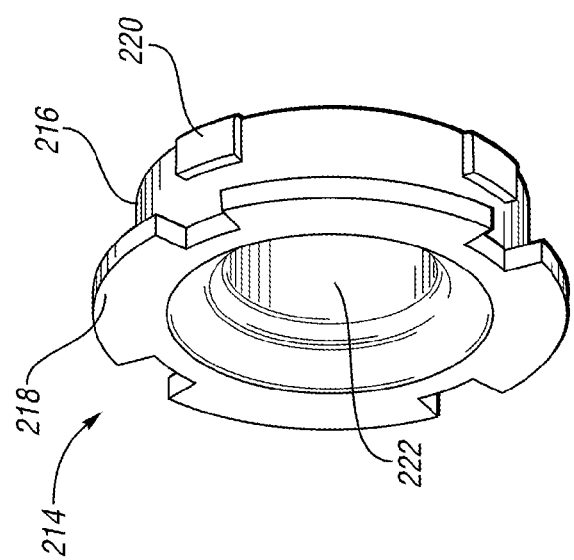
FIG. 8 is a partial section perspective view of a receptacle assembly according to another embodiment.
Figure 22:
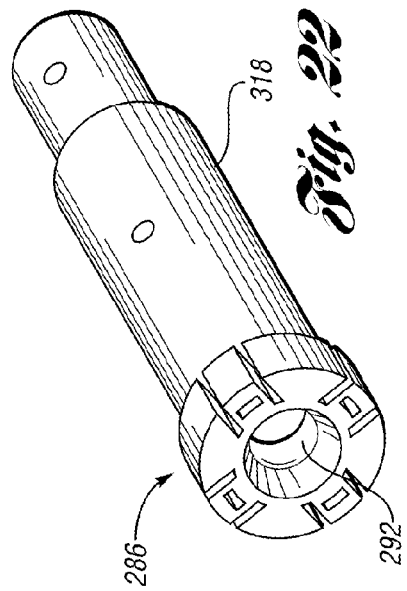
FIG. 22 is a perspective view of a receptacle assembly according to another embodiment.
Figure 25:
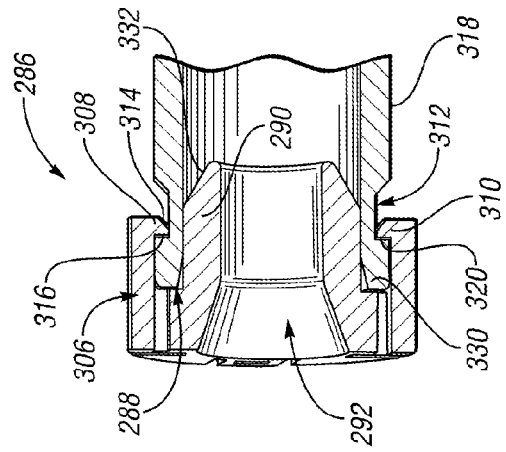
FIG. 25 is an enlarged section view of a distal end of the receptacle assembly of FIG. 22.
Figure 23:
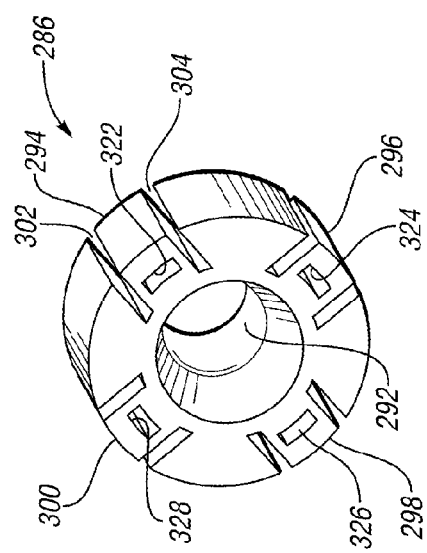
FIG. 23 is an enlarged front perspective view of a retainer of the receptacle assembly of FIG. 22.
Figure 24:
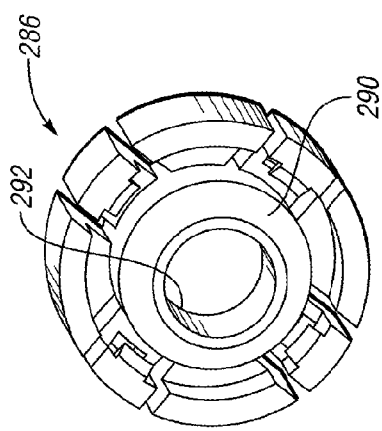
FIG. 24 is an enlarged rear perspective view of the retainer of FIG. 23.

FIG. 8 illustrates a receptacle assembly 204 according to another embodiment. The receptacle assembly 204 includes a housing 206 with a receptacle 208 formed therein. A groove 210 is formed within the receptacle 208. A terminal 212 is received within the receptacle 208. A retainer 214 is provided with a guide body 216 received within the receptacle 208. The retainer 214 is also illustrated in FIG. 9. A shoulder 218 extends from the retainer 214. An array of lugs 220 extend from the guide body 216 and are received within the groove 210 for locking and retaining the retainer 214 to the receptacle 208. The lugs 220 may be oversized within the groove 210 to provide an additional interference fit. Additionally, the guide body 216 may be oversized relative to the receptacle 208 to provide an additional interference fit. The lugs 220 are spaced about the periphery to distribute any load caused in installation to minimize deflection to an aperture 222 within the guide body 216.

FIG. 10 illustrates a receptacle assembly 224 according to at least one embodiment. The receptacle assembly 224 includes a housing 226 with a receptacle 228 formed therein. A plurality of grooves 230 are formed within the receptacle 228 as also illustrated in FIG. 11. The grooves 230 are angled to provide barbed edges 232 facing away from an opening 234 of the receptacle 228.

FIGS. 10, 12 and 13 illustrate a retainer 236 with a body 238 and a shoulder 240. An aperture 242 is formed through the body 238 and the shoulder 240. An array of ribs 244 are provided on the body 238, which are oversized relative to the receptacle 228. The ribs 244 engage the grooves 230 during insertion and are retained by the barbed edges 232. The barbed edges 232 inhibit disassembly of the retainer 236 form the receptacle 228 and control a force required to install the retainer 236.

FIGS. 14-16 illustrate a receptacle assembly 246 according to at least another embodiment. The receptacle assembly includes a housing 248 with a receptacle 250. A retainer 252 is illustrated in FIGS. 14-17 with a body 254 received within the receptacle 250. The body 254 is undersized relative to the receptacle 250 to provide a clearance or slip fit. A shoulder 256 extends across an opening 258 of the receptacle 250 in the housing 248. A sleeve 260 extends partially over the housing 248 form the shoulder 256. An inner diameter of the sleeve 260 is undersized relative to an outer diameter of the housing 248 to provide an interference fit of the retainer 252 upon the housing 248. The sleeve 260 avoids deformation to the guide body 254 and an aperture 262 within the guide body 254.

FIGS. 18 and 19 illustrate a receptacle assembly 264 according to another embodiment. A receptacle housing 266 is provided with a receptacle 268 formed within the housing 266. A retainer 270 is provided with a guide body 272 extending into the receptacle 268 with clearance therebetween. The retainer 270 is illustrated in FIGS. 18-21. A shoulder 274 extends across an opening 276 of the receptacle 268. A sleeve 278 extends over the receptacle housing 266. The sleeve 278 includes an inner diameter that is undersized relative to the receptacle 268 to provide an interference fit with the receptacle 268 for retention of the receptacle 268 therein. The sleeve 278 includes an array of notches 280 formed therein external of a distal end 282 of the receptacle housing 266 to permit deformation during installation without disrupting an aperture 284 within the guide body 272. The sleeve 278 may be a socket 140 in the first housing portion 136 thereby eliminating a separate retainer and minimizing parts.

FIGS. 22-25 illustrate an exterior connecting snap-fit end cap 286 in accordance with one non-limiting aspect of the present invention. The end cap 286 may be similarly configured to the retainers shown above with respect to having an end stop portion 288 and an inserted portion 290. An opening 292 extends through the end stop portion 288, and the inserted portion 290 to facilitate guiding the connector into the resilient element (not shown). The opening 292 may be sized to provide a tapered opening that narrows to more closely align with the connector. The end cap 286, unlike the retainers described above, may include a plurality of snap fingers 294, 296, 298, 300 defined by corresponding channels 302, 304 (only one channel set is labeled) within an overlapping portion 306 extending beyond the end stop portion 288. The snap fingers 294, 296, 298, 300 are shown to include fingers 308, 310 that have a tip 312 with a leading edge 314 for extension of the snap fingers 294, 296, 298, 300 during installation. Each tip 312 is retained within a channel 316 included on an exterior portion of a housing 318. Each tip 312 may include an abutment edge 320 for engaging the channel 316. The configuring of the snap fingers 294, 296, 298, 300 to engage an exterior portion of the connector 318 may be beneficial in facilitating removal of the end cap 286 without having to use a tool, i.e., the tool may be required to remove the interior connecting end caps.

Reliefs 322, 324, 326, 328 may be included in the overlapping portion 306 rearwardly of the tips 312 of the fingers 294, 296, 298, 300. The reliefs 322, 324, 326, 328 may be provided to facilitate removal of the end cap 286 from a molding tool without having to open the molding tool. The housing 318 shown in FIG. 25 includes a chamfered leading edge 330 that cooperates with a correspondingly chamfered leading edge 332 of the inserted portion 290 of the end cap 286. These chamfered edges 330, 332 may be helpful facilitating insertion of the end cap 286 within the recessed end of the housing 318. The end cap 286 is shown to include four equally spaced snap fingers 294, 296, 298, 300, however, the end cap 286 may include any number of snap fingers 294, 296, 298, 300 without deviating from the scope contemplated by the present invention. The end cap 286 may be comprised of a suitable conducting or non-conducting material.

Figure 26:
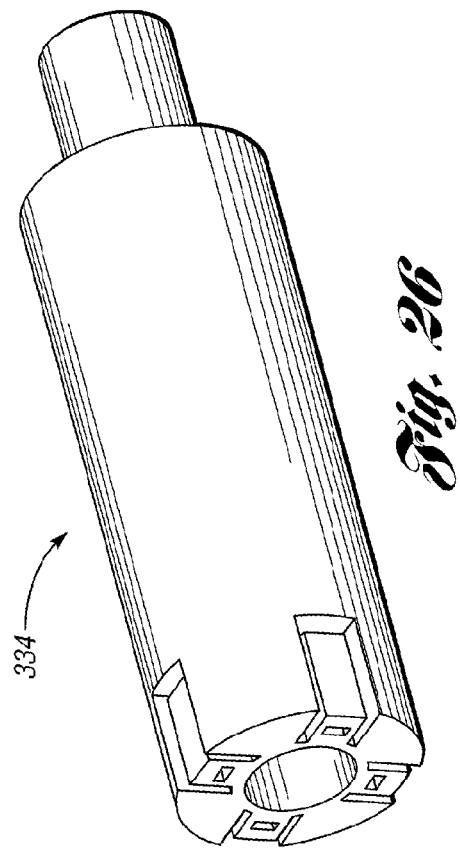
FIG. 26 is a perspective view of a receptacle assembly according to another embodiment.
Figure 27:
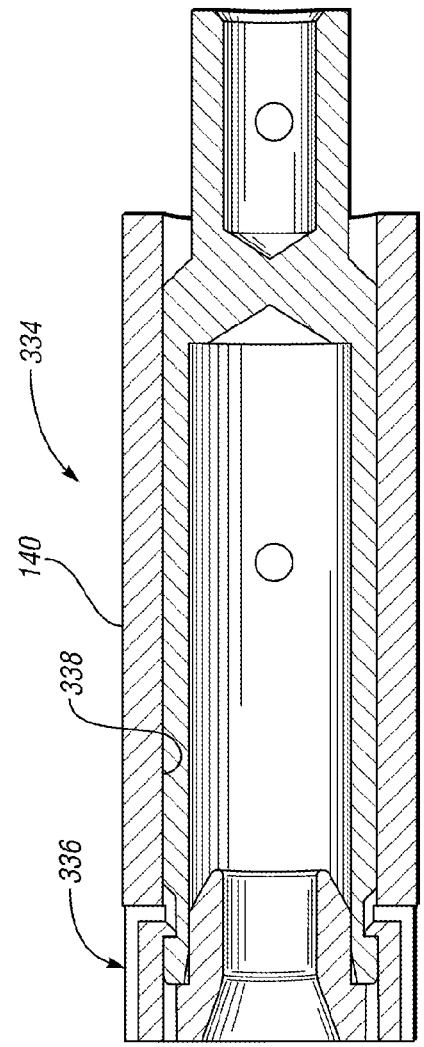
FIG. 27 is a section view of the receptacle assembly of FIG. 26.
Figure 32:
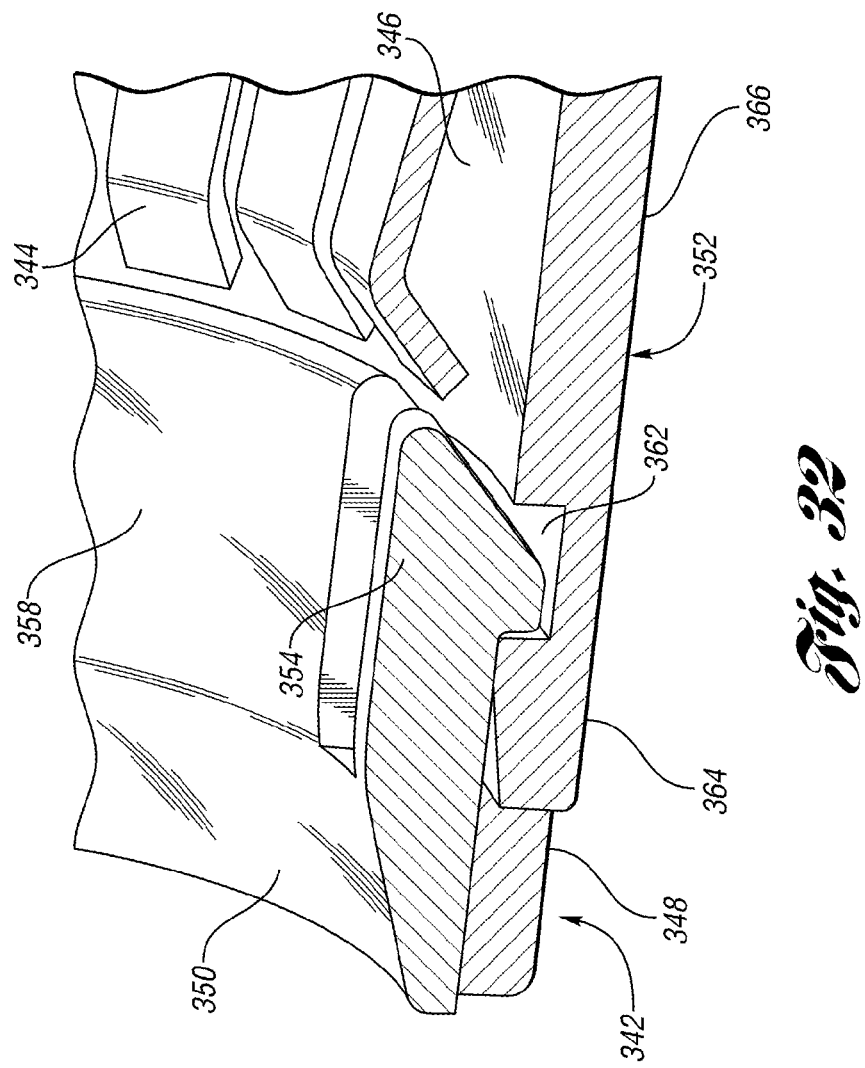
FIG. 32 is an enlarged partial section perspective view of the distal end of the receptacle assembly of FIG. 30.

The end cap 286 shown in FIGS. 22-25 includes the overlapping portion 306 extending a slight distance over the housing 318. FIGS. 26-28 illustrate an end cap 334 where an overlapping portion 336, similar to the overlapping portion 306 shown in FIGS. 22-25, extends approximately the entire length of a first recess 338 and to an area proximate a second recessed 340 end to form a sleeve/housing. This sleeve-type of end cap 334 may be integrated within a socket 140 of the connector assembly 120.

FIGS. 29-32 illustrate an interior connecting snap-fit end cap 342 operable to be added to one of the receptacle housings noted above or other similarly recessed terminals in accordance with one non-limiting aspect of the present invention. The end cap 342 may be configured to be positioned outboard of a resilient element 344. Optionally, the end cap 342 may be configured to have a length sufficient to pre-load the resilient element 344 such that it at least partially compresses the resilient element 344 toward a rearward wall of a recessed end 346, which may be beneficial protecting the contact beams and compensating for manufacturing tolerances. The end cap 342 may be configured to prevent removal of the resilient element 344 from a recessed end. The end cap 342 may include an end stop 348 having a width ESW slightly larger than an outer width of the recessed end 346 in order to control how far the end cap 342 is able to insert. The end cap 342 includes an opening 350 to permit passage of a connector (not shown). The opening 350 may include a slightly larger width OW at a beginning portion and then taper down thereafter to a width EW approximately equal to the width of the connector. The width EW may be selected to provide an interference fit with the connector, although it is not necessary that an interference fit be provided as the end cap 342 may be used simply to guide the connector into the resilient element/recessed end 344, 346. Optionally, a narrowest width NW of the resilient element 344 at a tip portion may be selected to be slightly smaller than the width EW of the opening 350 and/or the connector in order to ensure a sufficient electrical connection between the resilient element 344 and the connector. The exterior width ESW of the end stop 348 may be sized to correspond with an exterior width of a housing 352 in order to provide a flush exterior surface.

The snap-fit end cap 342 may be comprised of a conducting or non-conducting material, such as but not limited to plastic or rubber. The material may be selected to be of a type sufficient to facilitate use of a plurality of snap fingers 354. The snap fingers 354 may be defined by channels 356 included within an inserted portion 358 of the end cap 342. The end of the snap fingers 354 may be shaped into a finger 360. The finger 360 may snap into a corresponding recessed channel 362 of the recessed end 346. The recessed channel 362 may include a width RW slightly larger than a width of the recessed end 346 at an outer portion 364 and a width of the recessed end at an inner portion 366. While the width of the recessed end 346 at the outer portion 364 is shown to be equal to the width of the inner portion 366, it may be larger or smaller depending on design consideration of the end cap 342, e.g., the width of the outer portion 364 may be larger than the inner portion 366 in the event the material characteristics of the end cap 342 require more material to facilitate the contemplated flexing of the snap finger 354, which may be required in the event the recessed end is relatively narrow.

A recess 368 may be included rearward of a tip of each finger 360 to facilitate molding of the end cap 342. The recesses 368 may be sized to approximate the height of the tip so that the end cap 342 can be laterally removed from a molding tool without having to open the tool. This may be beneficial in limiting tooling cost and associated manufacturing cost. Of course, embodiments of the present invention are not necessarily limited to this configuration and fully contemplate molding at least the end stop portion 348 without the recesses 368 so that a continuous ring of material can be provided. The snap-fit end cap 342 is shown to include three snap fingers 354 equidistantly spaced about the inserted portion 358.

FIGS. 33-35 illustrate an alternative embodiment of a snap-fit end cap 370 where a single snap finger 372 is included. The use of the single snap finger 372 configuration may be beneficial with narrower connectors and/or terminals where it may not be feasible to maintain the structural integrity of the end cap 370 while permitting the use of multiple snap fingers 372.

Figure 38:
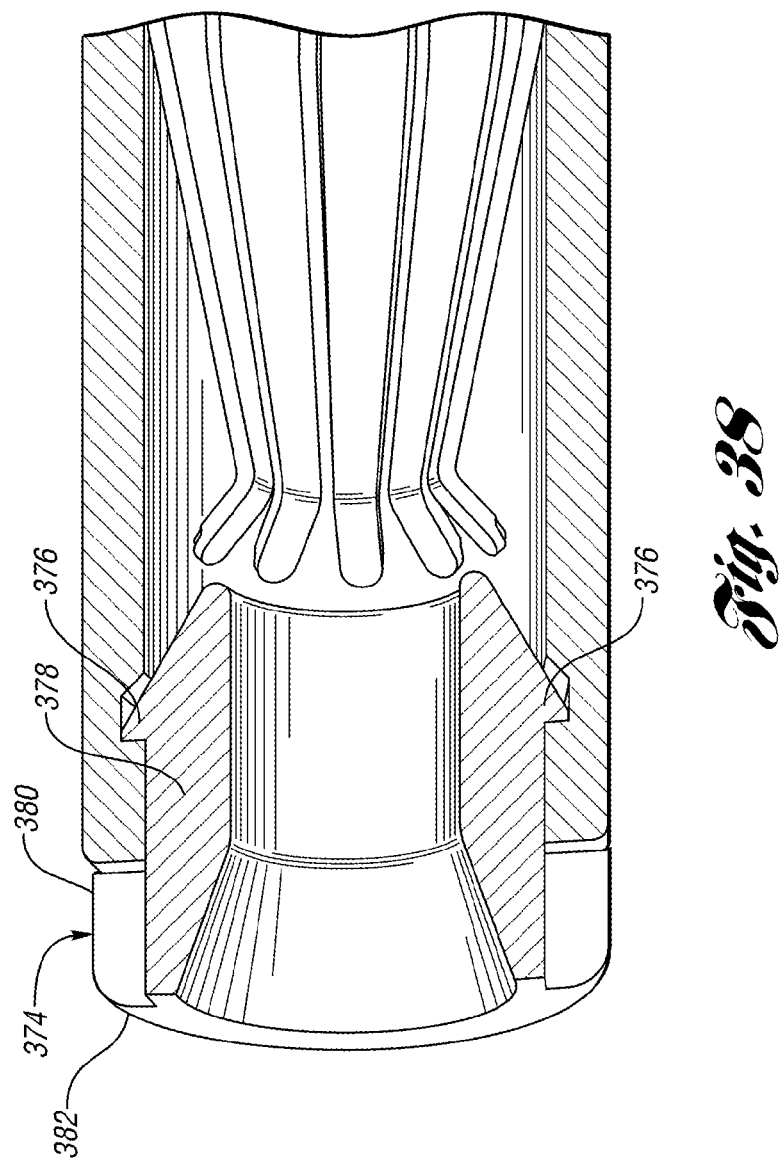
FIG. 38 is an enlarged partial section perspective view of a receptacle assembly according to another embodiment, illustrated with the retainer of FIG. 36.

Optionally, instead of defining the snap fingers 354 with channels 356 through the inserted portion 358 of the end cap 342, the channels 356 may be removed. FIGS. 36-38 illustrate an alternative embodiment of a snap-fit end cap 374 similarly configured to the end cap 342 except for having channels 356 removed. In this configuration, a finger tip 376 instead extends outwardly from an inserted portion 378 to facilitate the snap fit. This configuration may require the size and shape of the end cap 374 and/or its material composition to allow some flexing or bending during insertion so that the finger tip 376 can compress within the outer portion 364 of the inner recess 368, and thereafter, decompress to be retained within the channel 362. As with the configuration shown in FIGS. 29-32, an area 380 behind the finger tip 376 is shown to be removed to form recesses 380 within an end stop portion 382 in order to facilitate removal from a mold tool. Of course, like the other embodiments, this material may not necessarily be removed. The embodiment shown in FIGS. 36-38 includes two fingers 376 to demonstrate the present invention contemplating the end cap including one, two, three or some other number of snap fingers.

FIG. 39 illustrates a receptacle assembly 384 according to another embodiment. The receptacle assembly 384 includes a housing 386 with a receptacle 388 for retention of a terminal. A dual material (or two-shot) retainer 392 is provided, which is also illustrated in FIGS. 39-42. A guide body 394 is formed from a first material, such as a polymeric material which is hard enough to guide the pin. The guide body 394 includes a shoulder 396 with an aperture 398 formed therethrough. A series of projections 400 are provided on the shoulder 396. A softer fastener layer 402, such as an elastomer, is overmolded onto the projections 400 to bond to the projections 400. The fastener layer 402 includes a shell 404 with a leading edge 406 for clearing the housing 386, and an abutment edge 408 for engaging the groove 390. Additional channels for designed flexibility are not required due to the flexibility of the fastener layer 402.

FIGS. 43-45 illustrate a receptacle assembly 410 according to another embodiment with a receptacle housing 412 with a receptacle 414. A guide body 416 is received within the receptacle with a slip or clearance fit. A shoulder 418 extends from the guide body 416; and a sleeve 420 extends over the housing 412, also with a clearance fit. The sleeve 420 is formed integral with the first housing portion 136 as a socket 140. The backing plate 144 is fastened to the first housing portion 136 thereby retaining the receptacle housing 412 within the socket 140.

The present invention contemplates using any one or more of the foregoing terminals within any type of electrical assembly or adding the end cap to other connectors/terminals, and particularly, using the terminals and/or the end caps within a vehicle charger connector assembly. U.S. application Ser. Nos. 13/073,478; 13/080,982; 13/070,576; 13/080,753; and 13/101,592, the disclosures of which are hereby incorporated by reference in their entirety, describe a vehicle charger connector assembly and various terminals to which the end caps shown above may be added.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A receptacle assembly comprising:
    a longitudinal housing with at least one receptacle formed therein with an opening at a distal end of the housing;
    an electrically conductive terminal received within the receptacle;
    a longitudinal guide body received within the receptacle in engagement with the terminal, the guide body having an aperture formed therethrough, sized to receive a pin through the aperture; and
    at least one fastener extending from the guide body to provide an interference fit with the housing;
    wherein the at least one fastener comprises at least two extensions extending into the at least one receptacle that are collectively oversized relative to the receptacle to provide the interference fit with the housing and are spaced apart a distance greater than the aperture.

2. The receptacle assembly of claim 1 further comprising a shoulder extending transversely from the guide body to engage a distal end of the receptacle and to position the guide body relative to the receptacle, wherein the at least two extensions extend from the shoulder.

3. The receptacle assembly of claim 2 wherein the guide body further comprises at least two guide body extensions extending from the shoulder into the at least one receptacle.

4. The receptacle assembly of claim 2 wherein a groove is formed in the housing to cooperate with the fastener.

5. A receptacle assembly comprising:
    a longitudinal housing with at least one receptacle formed therein with an opening at a distal end of the housing;
    an electrically conductive terminal received within the receptacle;
    a longitudinal guide body received within the receptacle in engagement with the terminal, the guide body having an aperture formed therethrough, sized to receive a pin through the aperture; and
    at least one fastener extending from the guide body to provide an interference fit with the housing;
    wherein a groove is formed in the housing to cooperate with the fastener.

6. The receptacle assembly of claim 5 wherein the at least one fastener comprises at least one lug extending into the groove.

7. The receptacle assembly of claim 5 wherein the at least one fastener comprises at least one rib extending across the groove.

8. The receptacle assembly of claim 7 wherein the groove provides a barbed edge to engage the at least one rib.

9. The receptacle assembly of claim 5 wherein the at least one fastener comprises at least one snap finger.

10. The receptacle assembly of claim 5 wherein the at least one fastener comprises a plurality of snap fingers.

11. The receptacle assembly of claim 5 wherein the at least one fastener comprises at least one snap finger with a distal end shaped into a finger to be received in a groove.

12. The receptacle assembly of claim 11 wherein a recess is provided rearward of a tip of the finger.

13. The receptacle assembly of claim 12 wherein the recess is sized approximate to a height of the tip for lateral removal from a molding tool.

14. A receptacle assembly comprising:
    a longitudinal housing with at least one receptacle formed therein with an opening at a distal end of the housing and a groove formed in the housing;
    an electrically conductive terminal received within the receptacle; and
    a retainer to retain the electrically conductive terminal within the receptacle, the retainer comprising:
        a longitudinal guide body sized to be received within the receptacle and engage the terminal to retain the terminal within the receptacle, the guide body having an aperture formed therethrough sized to receive a pin through the aperture to contact the terminal, and
        at least one fastener extending from the guide body to fasten the retainer to the receptacle, wherein the guide body is received within the receptacle, and the at least one fastener is received within the groove;
    wherein the groove is formed within the receptacle; and
    wherein the at least one fastener is oriented external of the guide body.

15. The receptacle assembly of claim 14 wherein the at least one fastener comprises at least one lug.

16. The receptacle assembly of claim 14 wherein the guide body is formed from a first material; and
    wherein the fastener is formed from a second material that is more flexible than the first material.

* * * * *